Oct. 30, 1923.
R. S. BONNER
COTTON THINNING MACHINE
Filed Sept. 5, 1922    2 Sheets—Sheet 1
1,472,288
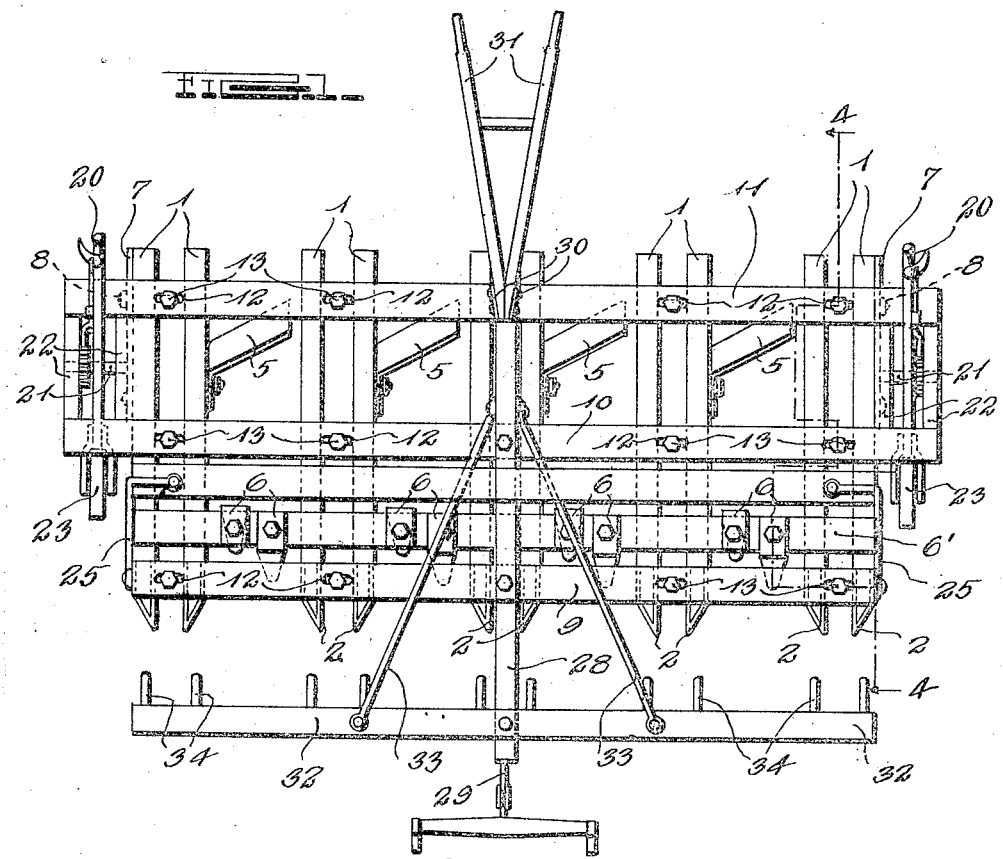
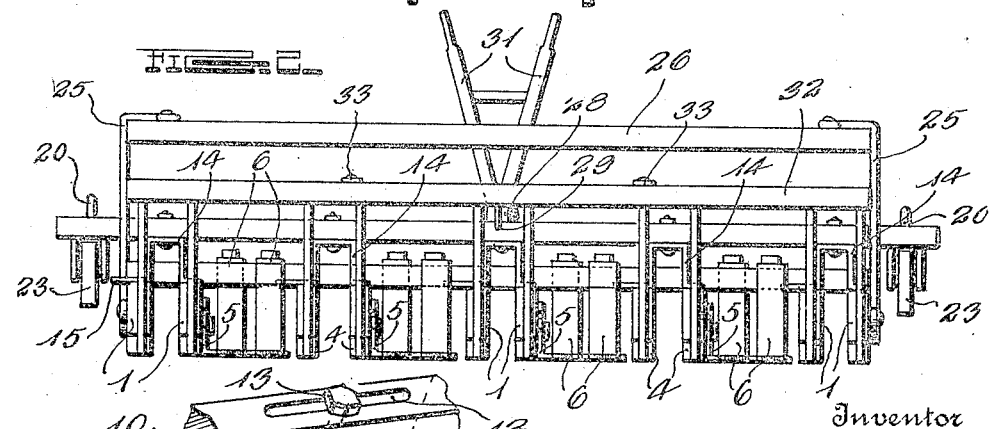
Inventor
R. S. Bonner

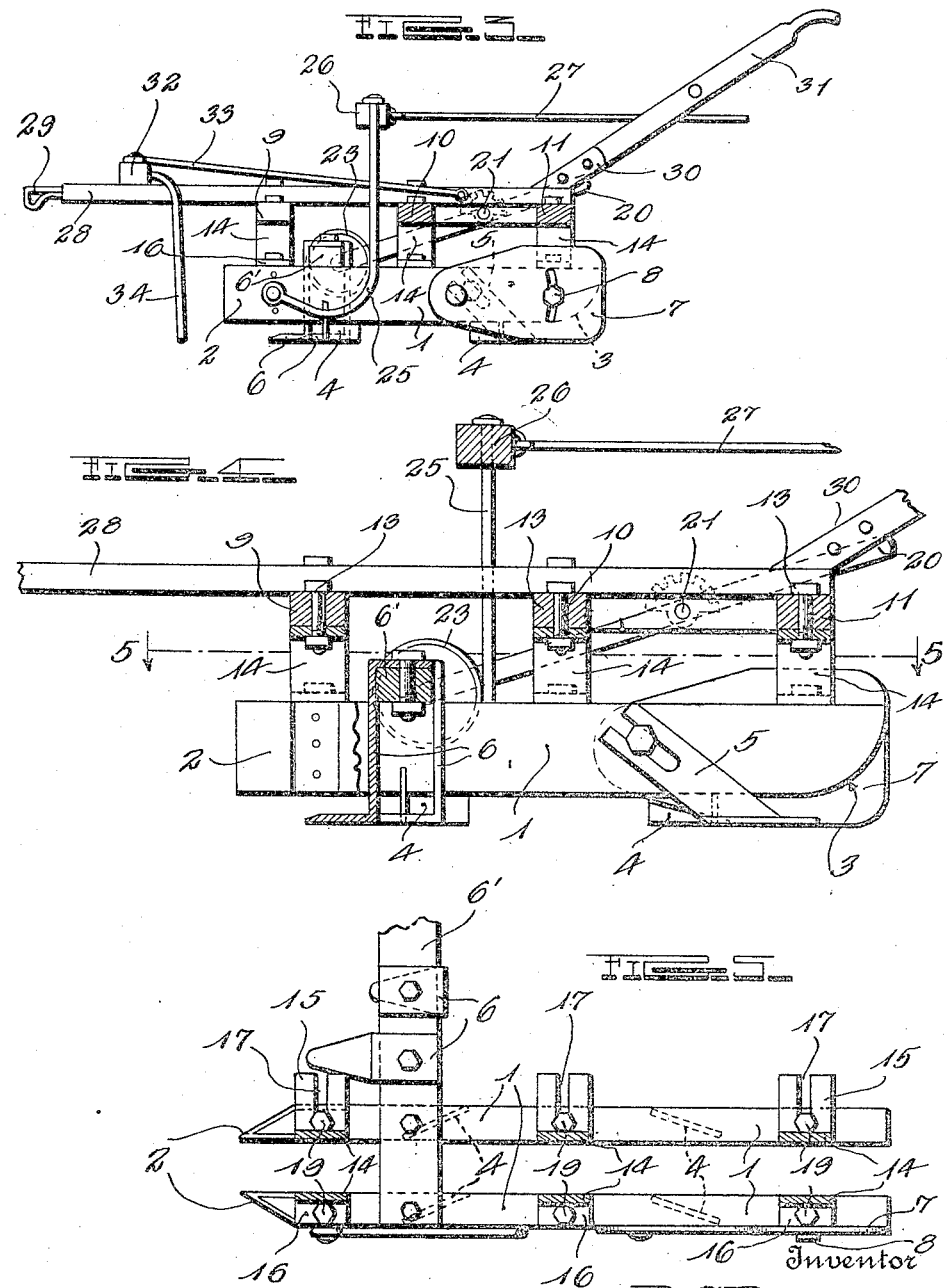

Patented Oct. 30, 1923.

1,472,288

UNITED STATES PATENT OFFICE.

RICHARD S. BONNER, OF LA GRANGE, ARKANSAS.

COTTON-THINNING MACHINE.

Application filed September 5, 1922. Serial No. 586,202.

*To all whom it may concern:*

Be it known that I, RICHARD S. BONNER, a citizen of the United States, residing at La Grange, in the county of Lee and State of Arkansas, have invented certain new and useful Improvements in Cotton-Thinning Machines; and I do declare the following to be a full, clear, and exact description of the invention, such as will enable others skilled in the art to which it appertains to make and use the same.

This invention relates to an improved agricultural machine for use in thinning crops of cotton and similar plants which are planted in rows and must then be thinned out so that certain of the growing plants will be left standing spaced apart and the remainder will be cut out of the ground.

Another object of the invention is to provide a machine of the character described in which the portions of the machine which carry the cultivator blades may be adjusted to the proper spaced relation and thus the space between the blade carrying boards or machine sections controlled.

Another object of the invention is to provide a machine which can be guided by rudders for holding the machine against side play when in use.

Another object of the invention is to provide a thinning out machine which can be rendered inoperative when making a turn or when being moved from one field to another.

Another object of the invention is to provide a machine of the character described which will be both strong and durable and simple in construction.

This invention is illustrated in the accompanying drawings, wherein:

Figure 1 is a top plan view of the improved machine.

Figure 2 is a view showing the machine in front elevation.

Figure 3 is a side elvation of the improved machine.

Figure 4 is a sectional view taken along the line 4—4 of Fig. 1.

Figure 5 is a fragmentary sectional view of a portion of the machine taken along the line 5—5 of Fig. 4.

Figure 6 is a fragmentary perspective view showing a hanger bracket and a fragment of one of the bars which carries the brackets.

This improved machine which is to be used for thinning out plants in cotton rows is provided with a plurality of bars 1 which are arranged in groups and each of which is preferably in the form of a wooden bar but may be formed of any suitable material desired. Each of these bars has its forward end portion beveled off and covered by a protecting shoe 2 and each section further has its rear end portion curved upwardly for easy movement as shown at 3. Blades 4 which extend diagonally of the bars are secured to the underfaces thereof so that when the machine is drawn across a field, plants beneath the bars will be removed as well as plants which are between the groups of bars. Slicing blades 5 have their shanks secured to the sides of the bars and these blades 5 extend diagonally across the space between the groups of bars. These slicing blades are positioned to the rear of uprooting blades 6 which resemble cultivator blades and are positioned near the forward end of the machine. The blades 4, 5 and 6 remove plants and thus thin out the plants in the rows. In order to carry the blades 6, there has been provided a cross bar 6' carried by the end ones of the bars 1. Depending rudder forming blades 7 are provided at the rear ends of certain of these sections to slice into the ground as the machine moves across a field and prevent side draft, fasteners 8 being provided to secure the blades 7 in position to cut into the ground the desired amount.

In order to provide supporting means for the bars 1, there has been provided cross bars 9, 10 and 11. These cross bars are provided with slots 12 through which extend securing bolts 13 carried by hanger brackets 14 which are U-shaped and have their depending arms bent to provide outwardly extending feet 15 and 16, one of which is provided with a longitudinally extending slot 17 and the second of which is provided with an opening 18. Bolts 19 are carried by the blade carrying sections 1 and pass through these openings 18 and slots 17 so that the hanger brackets which straddle the spaces between the bars of each group of bars 1 will each have one arm rigidly connected with a blade carrying bar and a second arm adjustably connected with a blade carrying bar. Therefore, the blade carrying bars may be moved closer together or farther apart and the bolts 19 then tightened and further the bolts 13 may be loosened and the hanger brackets adjusted upon the cross bars and the bolts then tightened to secure them in the set position. It will thus be seen that with this construction, the blade carrying bars may be properly adjusted so that the machine will cut away the proper number of plants in a row and leave the plants which are not unrooted standing the proper distance apart. In order to permit the machine to be turned at the end of a field or moved from one field to another, without the sliding blades and uprooting blades engaging the ground, there has been provided levers 20 which are latch levers and are pivotally mounted upon shafts 21 carried by cross strips 22 secured between the cross bars 10 and 11. These levers carry ground-engaging wheels 23 which may be brought into engagement with the ground and the levers then locked in the set position by means of the racks 24 and co-operating pawls of the levers. With the levers secured in the set position with the wheels engaging the ground, the machine will be supported by these wheels and levers and the slicing blades and uprooting blades will not engage the ground.

In addition to the wheel carried means for lifting the device to an inoperative position, there has also been shown curved runners 25 which are pivotally connected with the forward end portions of the end bars 1 and normally are positioned as shown in Fig. 3 with their curved end portions engaging the ground and their straight end portions extending upwardly and connected by a cross bar 26. A pull line 27 is connected with the cross bar 26 and extends rearwardly so that when desired the driver can draw the line 27 rearwardly and thus swing the runners downwardly to an operative position. These runners will serve to lift the forward end portion of the device and render the device inoperative. Therefore, the device may be readily turned around at the end of a row. It is of course understood that the machine may be provided with both the elevating means just described and the elevating means including the wheels and levers or may be only provided with one or the other.

In order to permit the machine to be drawn across a field, there has been provided a draft bar 28 which extends longitudinally of the machine and is secured upon the cross bars 9, 10 and 11. This draft bar is provided at one end with a clevis 29 with which a draft equalizer is adapted to be connected. At its rear end, there has been provided a bracket 30 for carrying handles 31 to be grasped by the operator. In addition to providing means for carrying the draft equalizer and handles, the draft bar also serves as means for carrying a rake 32. This rake 32 is secured to the forward end portion of the draft bar and is braced by means of the diagonally disposed braces 33. The teeth 34 of the rake extend to engage the ground in front of the bars 1 and will serve to remove trash from the field. It will thus be seen that when a machine is drawn across a field, the rake will remove trash and therefore the small cotton plants can be very easily uprooted.

It should be noted that if desired the machine may be made larger and a greater number longitudinally extending bars provided. In a larger machine it will of course be necessary to provide for additional draft animals. It is also desired to point out that this machine spaces, thins and plows between the hills at the same time.

I claim:

1. A plant thinning machine comprising a plurality of blade carrying sections, cross bars above said sections, hanger brackets connected with the cross bars for adjustment longitudinally thereof, the brackets straddling space between the sections and each having one end portion adjustably connected with a section and its second end portion rigidly connected with a section, rudder strips carried by the sections for engaging the ground, and draft means in front of the forward end portions of said sections.

2. A plant thinning machine comprising a plurality of blade carrying sections, cross bars above said sections, hanger brackets adjustably connected with the cross bars for adjustment longitudinally thereof and straddling space between said blade carrying sections and adjustably connected with said sections for permitting adjustment of the sections longitudinally of the bars towards and away from each other, and draft means connected with the forward end portions of said sections.

3. The structure of claim 2 having the cross bars provided with slots and the hanger brackets provided with securing bolts extending through the slots, and each bracket having outstanding section engaging feet, one foot being provided with a fastener receiving opening and the second with a fastener receiving slot.

4. A plant thinning machine comprising a plurality of sections, cross bars and brackets for supporting the sections in spaced relation, uprooting elements carried by said cross bars, knives carried by certain of said sections and extending diagonally therefrom for slicing into the ground as the machine moves across a field, rudder blades carried by the rear end portions of certain of said sections, and draft means connected with the front end portions of said sections.

5. The structure of claim 2 and cross strips connecting the cross bars, pivotally mounted latch levers, racks for the levers carried by said cross strips, and ground-engaging wheels carried by said levers.

6. The structure of claim 2 and runner bars having curved forward end portions pivotally connected with certain of the blade-carrying sections, a cross bar connecting the rear end portions of said runners and extending above the blade carrying sections and cross bars, and means for moving said bar to swing the runners downwardly into operative engagement with the ground.

7. The structure of claim 2 and a bar extending longitudinally of the machine and secured upon said cross bars and having its forward end portion adapted for connection with a draft appliance, a rake secured upon the forward end portion of the last mentioned bar and extending transversely thereof in front of the blade carrying sections, and bracing means for said rake.

8. The structure of claim 2 and a bar extending longitudinally of the machine and secured upon said cross bars and having its forward end portion adapted for connection with a draft appliance, a rake secured upon the forward end portion of the last mentioned bar and extending transversely thereof in front of the blade carrying sections, and operating handles connected with the rear end portion of the longitudinally extending bar.

In testimony whereof I have hereunto set my hand.

RICHARD S. BONNER.

Witness:
R. S. McClintock.